March 31, 1931. O. G. SIMMONS Re. 18,021

METHOD OF CUTTING GEAR TEETH

Original Filed March 24, 1927 4 Sheets-Sheet 1

INVENTOR
Oliver G. Simmons
BY
Kerr Hudson & Kent
ATTORNEYS

March 31, 1931. O. G. SIMMONS Re. 18,021

METHOD OF CUTTING GEAR TEETH

Original Filed March 24, 1927 4 Sheets-Sheet 2

INVENTOR
Oliver G. Simmons
BY
Kerr Hudson & Kent
ATTORNEYS.

March 31, 1931. O. G. SIMMONS Re. 18,021

METHOD OF CUTTING GEAR TEETH

Original Filed March 24, 1927 4 Sheets-Sheet 3

INVENTOR
Oliver G. Simmons
BY
Kerr Hudson & Kent
ATTORNEYS.

March 31, 1931. O. G. SIMMONS Re. 18,021

METHOD OF CUTTING GEAR TEETH

Original Filed March 24, 1927 4 Sheets-Sheet 4

INVENTOR
Oliver G. Simmons
BY Kerr Hudson & Kent
ATTORNEYS

Reissued Mar. 31, 1931 Re. 18,021

UNITED STATES PATENT OFFICE

OLIVER G. SIMMONS, OF LAKEWOOD, OHIO

METHOD OF CUTTING GEAR TEETH

Original No. 1,765,385, dated June 24, 1930, Serial No. 178,021, filed March 24, 1927. Application for reissue filed September 10, 1930. Serial No. 481,041.

This invention relates to a method of cutting gear teeth. In a helical gear the teeth are disposed at an angle with respect to the axis, more commonly though incorrectly called spiral gears in the shop and referred to by others as gears with twisted teeth. It is well understood by engineers, however, that the teeth are arranged on the curve of the helix, for the reason the teeth are cut in a cylindrical body in which the lead of advance of the teeth for practical commercial purposes is made uniform. In a spur gear the teeth are straight. These gears are intended to translate motion from one shaft to another, all of which is well understood in the art.

Various methods have been practiced commercially in cutting the teeth of helical gears, some of which may be referred to briefly. The oldest in point of time is probably the milling machine method by which the index head of said machine is geared to give the proper rotational movement to the work with respect to the longitudinal travel of the table slide, a rotary form cutter being used and caused to pass through the work and after cutting one tooth, indexing to the next and so on.

The next earliest is probably that of Hugo Bilgram, patent dated August 21, 1900, No. 656,166, in which a reciprocating tool having the form of a truncated V and operating when in contact with the teeth of a spur or helical gear blank on the principle described as the principle of evolution. The truncated V-shaped tool it will be realized is the single tooth of a rack.

The next in point of time probably is that of the hobbing method by which a hob is caused to pass across the face of a spur or helical gear blank to produce the gears desired.

The next development in point of time appears to reside in the shaping method in which a gear shaped cutter having its teeth twisted to correspond to the angle of helix of the helical teeth adapted to be cut in the blank is reciprocated in the direction of its axis across the face of the blank, the axis of the cutter being in a fixed position with respect to the axis of the blank, the axes of cutter and blank being in a plane. The cutter is brought into cutting contact with the blank to the fixed position referred to, and the cutter and blank rotate slowly with a velocity corresponding to a movement of feed, and as the cutter is reciprocated, it has in addition to the rotary feed movement referred to, a rapid rotary movement in one direction corresponding to the twist of the teeth of the cutter during the cutting stroke and a rapid rotary movement in the opposite direction corresponding to the twist of the teeth on the other motion, which is that of returning the cutter to the terminus of stroke while out of contact with the work preparatory to another cutting stroke.

In the method just described the axes of the cutter and work are in the same plane as referred to and this plane is fixed. It will be observed that due to the twist of the teeth of the cutter, the cutter has limited utility in that it can be used only for the helical gear having a helical angle corresponding to the helical angle of the cutter.

Machines operating on the method just described have been commercially developed I understand by the Fellows Gear Shaper Company, under patent to Edwin R. Fellows, and by the Farrel Foundry & Machine Company, under patent to W. E. Sykes.

The present invention has for an object to provide a method of generating, with a standard straight tooth gear shaper cutter, gears with helical teeth disposed at any helix angle and further to generate helicoid tooth faces such that all gears cut by the same cutter, or any other straight tooth gear shaper cutter conjugate to the same rack, will mesh properly with each other.

A further object of the invention is to provide a method of generating spur, or straight tooth gears with a straight tooth gear shaped cutter by rotating a gear shaped cutter and reciprocating the cutter across the face of a gear blank rotating in intermeshing relation with said cutter, and simultaneously tangentially moving the cutter and blank closer together by relative movement along a line tangential to a pitch circle of the cutter.

A further object of the invention is to provide a method of generating helical or straight tooth gears with a gear shaper cutter by which the cutter has true generating action on the curves of the tooth faces being generated on the gear blank during the feed of the cutter.

A further object is to provide a method which lessens the mechanical difficulties in the cutting of gears and by which gears may be cut with greater accuracy.

The apparatus for practicing my invention utilizes a gear shaped cutter in which the teeth are not twisted to the angle of helix corresponding to the helical angle of the teeth of the blank to be cut. A characteristic aspect of the gear shaped cutter utilizable in the apparatus in the practice of my invention resides in the fact that a standard commercial straight tooth cutter, as distinguished from a twisted tooth cutter, of a normal pitch corresponding to the normal pitch of the helical gear may be used disregarding entirely the helical angle of the helical gear. A gear shaped cutter therefore in the practice of my invention of a given pitch may be used to cut the teeth of any helical gear of a given normal pitch. The normal pitch of the helical gear therefore is the determining factor in the practice of my invention in the utilization of a given pitch cutter and not the helical angle of the twisted teeth of the cutter referred to as being utilized in the Sykes or the Fellows patents and commercial practices of same.

My present invention resides broadly in the movements of a spur gear shaped cutter continuously rotating in one direction and reciprocating across the face of the gear blank or work, one stroke of which reciprocating movement is in effect a cutting stroke in cutting contact with the work, while the other stroke is non-effective, that is, non-cutting, it being a return of the cutter to the original position, and at the beginning of this stroke, the cutter is preferably given an additional movement to withdraw it from contact with the gear blank, to be again moved into position to effect contact during the cutting stroke; simultaneously tangentially moving the cutter or gear blank to bring the cutter and gear blank closer together and of continuing this movement in the same direction to move said cutter and blank apart; the work meanwhile rotating on an axis disposed to the axis of the cutter corresponding to the helical angle of the teeth desired in the blank, in one aspect of my invention, and, in another aspect of my invention, the work will meanwhile rotate on an axis parallel to the axis of the cutter to produce the straight teeth of spur gears.

From the foregoing it is understood that in the practice of my method the straight teeth of a spur gear will result if the axes of the work spindle and cutter spindle are adjusted and secured in parallel positions (not angular) one with the other, and that the twisted teeth of the helical or spiral gear will result if the aforesaid axes are adjusted and secured at an angle to each other. In my present method, therefore, forming the subject matter of this specification, the straight teeth in a spur gear, or the helical teeth in a spiral gear, will be produced dependent upon the adjustment of the axis of the work spindle with respect to the axis of the cutter spindle, or vice versa.

The movements of the cutter and work above referred to are very easily obtained and form the subject matter of a companion application for Letters Patent for gear shaper, Serial No. 443,185, filed April 10, 1930.

The drawings accompanying this specification are for purposes of illustration only.

Referring to the drawings, Fig. 1 is a plan view of one arrangement illustrating the method to cut a helical gear, with a schematic diagrammatic portion showing the position of the cutter in dotted lines at the beginning of the cutting operation in mesh with the imaginary rack shown by dot and dash line, said imaginary rack also meshing with the finished helical gear; and showing also the position of the cutter in mesh with said imaginary rack after it has completed the cutting of the teeth of the helical gear referred to.

Figure 1:
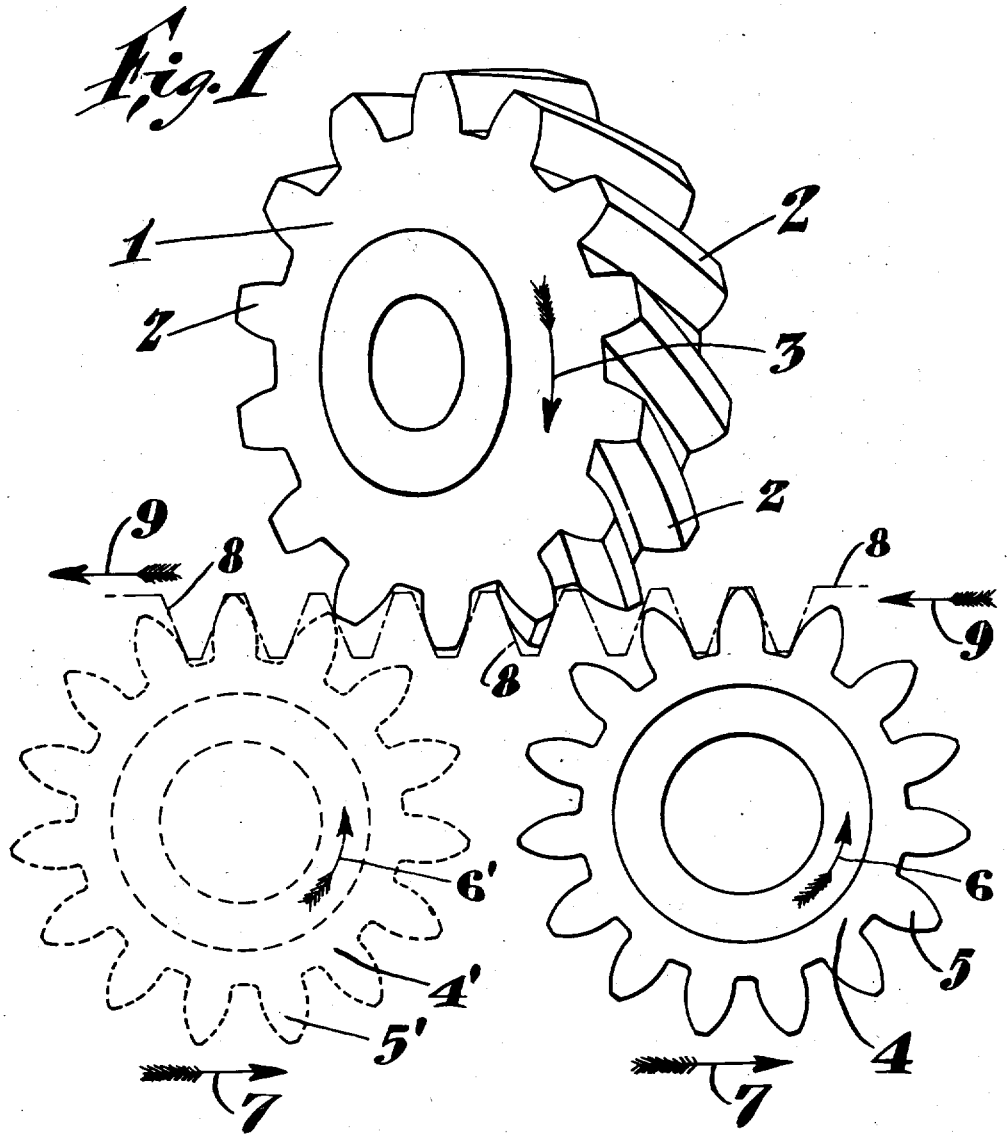
Figures 2, 3:
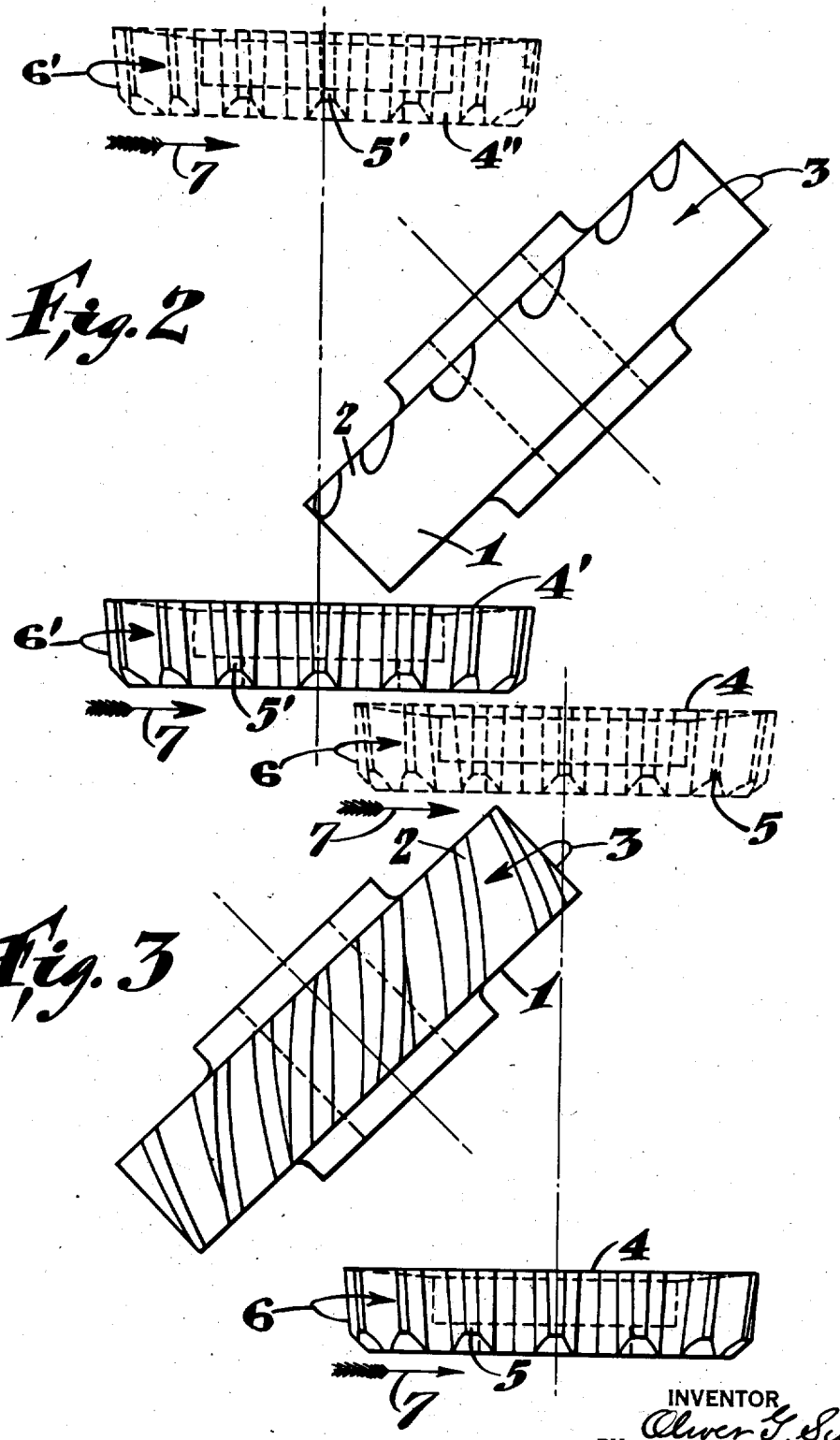
Fig. 2 is an end view of Fig. 1 viewed from the foot of the sheet, showing the position of the gear blank and the gear shaped cutter at the beginning of the cutting of the teeth.
Fig. 3 is similar to Fig. 2, except in this view the gear shaped cutter is shown as having completed the cutting of the helical teeth in the gear.

Referring to Fig. 1, the helical gear 1 is provided with the twisted teeth 2 and is adapted to rotate slowly on its axis in the direction of the arrow 3. The teeth 2 of the gear 1 are shown in the drawings as having been cut completely by means of the spur gear shaped cutter 4 which is provided with teeth 5. The cutter 4 is known commercially as a gear shaper cutter. The position of the cutter 4 as shown in the drawing, Fig. 1, is substantially the position of the cutter after it has completed the cutting of the teeth 2 of the helical gear 1. In this method the first position of the cutter 4 in cutting the teeth 2 of the helical gear 1 is indicated by the numeral 4′. The cutter in this position is shown and represented by dotted lines and is assumed to be reciprocating toward and away from the observer a required measure of distance to clear the gear 1 as illustrated in Fig. 2. The gear shaper cutter 4′ is also rotating in the direction of the arrow 6′ and moving in the direction indicated by the arrow 7. The rotary movement 3 of the helical gear 1 and the rotary movement 6′ of the gear shaped cutter 4′ being of such velocity as would be obtained if the gear 1 and cutter 4′ were meshing as shown with the imaginary rack 8, while the rack 8 is moving in the direction indicated by numeral 9, so that the cutter 4′, rotating continuously in the direction of the arrow 6′, slowly moves in the direction of the arrow 7, from the position of the cutter 4′ to the position of the cutter 4. In the foregoing movements it will be observed that the rotation of gear 1 and cutter 4 with intermeshing rack 8 is continuous, the imaginary rack therefore is of infinite length and its movement in the direction of the arrow 9 is continuous.

Figure 4:
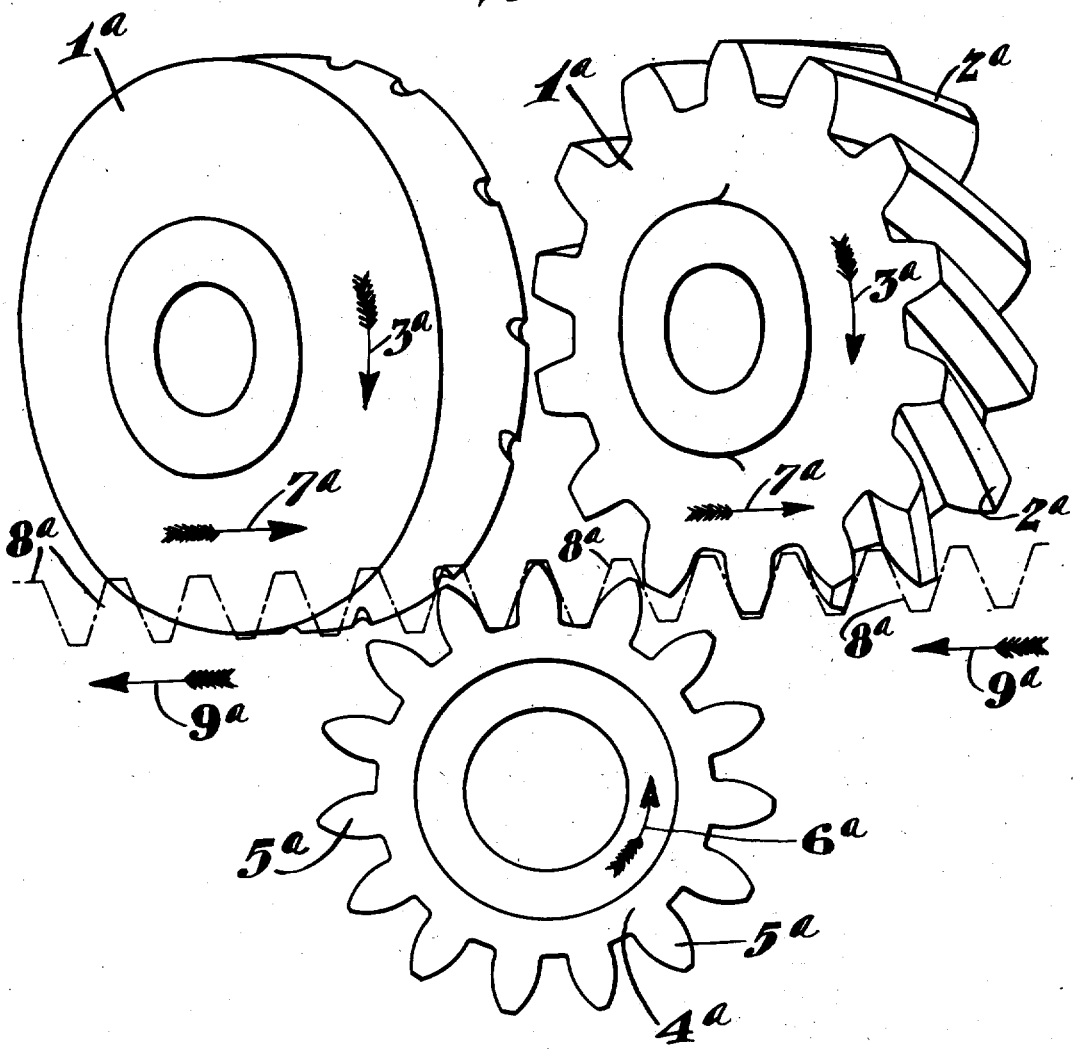
Fig. 4 is a plan view similar to Fig. 1, except that the helical gear is shown as having the two positions occupied by the cutter of Fig. 1, namely, before and after the teeth are cut.

It is obvious that I could just as readily continuously rotate and move the gear 1 in mesh with its continuously moving imaginary rack across and into and out of contact with the reciprocating rotating cutter as I have moved the cutter in mesh with the rack into and out of contact with the gear as described. This is illustrated in the drawing Fig. 4, the gear, cutter and parts thereof being indicated by the same reference numerals but having the exponent "a" attached.

Figure 5:
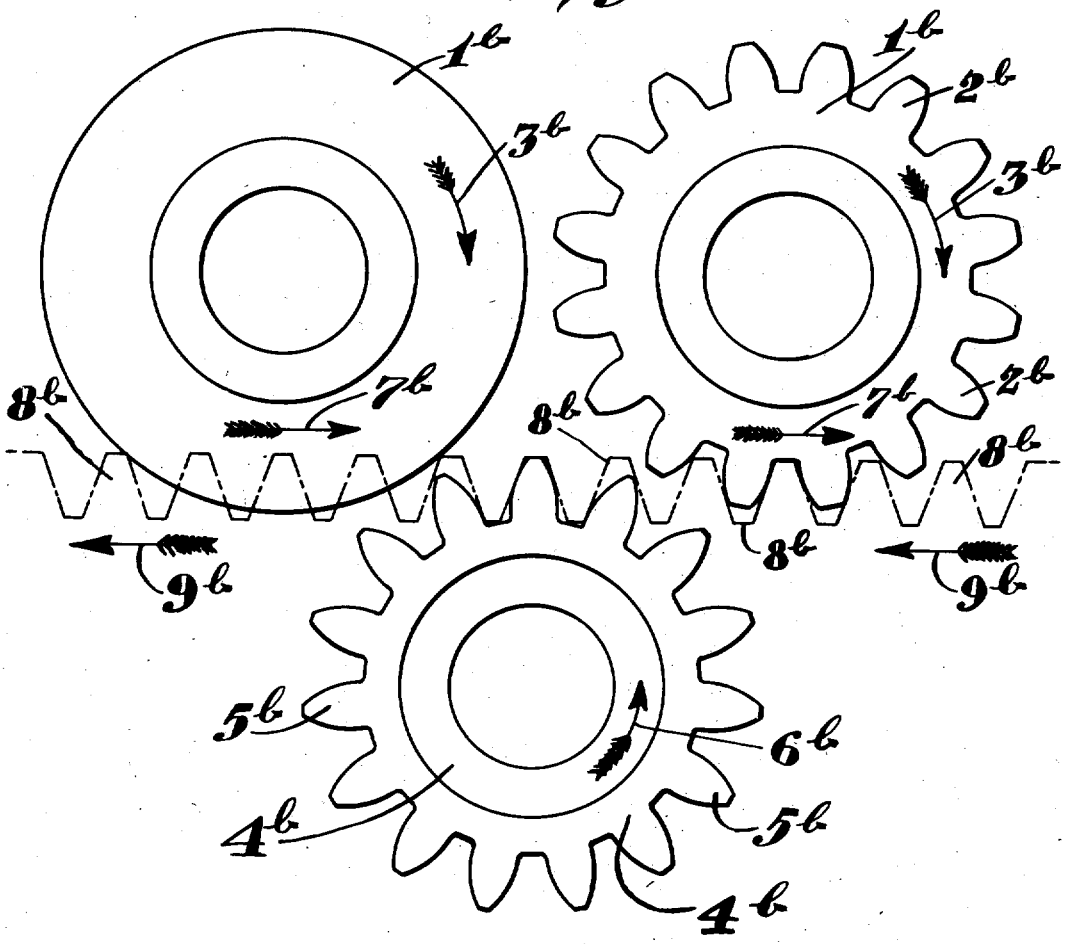
Fig. 5 is a plan view similar to Fig. 4, except that a spur gear having straight teeth is shown in two positions; at the beginning of the cutting of the teeth and after the teeth in the gear have been fully cut by the cutter.

It is also obvious that I can by the method herein described dispose the axes of the cutter and blank in parallel positions, one with the other, and produce the straight teeth of spur gears. This is illustrated in Fig. 5, the gear, cutter and parts thereof being indicated by the same reference numerals but having the exponent "b" attached. The straight teeth of a spur gear illustrated in Fig. 5 will result if the axes of the work spindle and cutter spindle are adjusted and secured in parallel positions (not angular), one with the other. By the expression secured in parallel positions, with reference to Fig. 5, I mean that the axes of the work and cutter spindles are perpendicular to the surface of the sheet of the drawing and are secured in said adjusted position. The same movements, however, as referred to, will continue and the axis of one will approach the axis of the other until finally the minimum measure of distance between said axes is reached, the movements continuing as described, therefore, will increase the measure of distance between said axes. In this movement the axes of the work spindle and cutter spindle will always be perpendicular to the sheet of the drawing of Fig. 5 and therefore parallel to each other.

The position of the cutter 4′, as it begins to cut the teeth of the gear 1, is illustrated in Fig. 2 and it will be observed that the position of the cutter 4′ is shown for purpose of illustration to the left of the gear 1, and on its lowermost position of the stroke the cutter is shown in full lines and at the top of its stroke it is represented by dotted lines and indicated by the numeral 4″. In Fig. 3 the teeth 2 of the gear 1 are shown as having been completed by the cutter 4, thus Fig. 2 corresponds substantially to the position of the gear 1 and cutter 4′ of Figs. 1 and Fig. 3 corresponds substantially to the position of the gear 1 and cutter 4 of Fig. 1.

Helical gears cut in accordance with the present invention will roll on the rack conjugate to the gear shaper cutter employed in cutting them and all gears of the same helix angle cut with straight tooth gear shaper cutters conjugate to the same rack will mesh properly with each other.

The helicoid tooth faces of the helical gear cut in accordance with the present invention are the same generically as would be cut in the methods of the prior art by a helical gear shaper cutter conjugate to the same rack as the straight tooth cutter employed in the present method.

It is quite obvious that if the helicoid tooth faces of the helical gear cut in accordance with the present invention are adapted to be used as cutting teeth, the helical gear produced by this invention could be used as the cutter to produce, by the method of the present invention, the conjugate rack or intermeshing conjugate straight tooth gears by simply reversing the cutter and blank, thereby producing a straight tooth involute gear with a helical tooth gear shaper cutter.

The method of the present invention requires less complicated machinery since the rates of rotation of the blank and cutter are independent of the speed of the cutting stroke, while in machines for cutting gears with a helical gear shaper cutter, the speed of rotation of the cutter must be correlated with the speed of longitudinal movement of the cutter during the cutting stroke as well as with the speed or rotation of the blank.

A further very important feature of the invention is the provision of a method of feeding the cutter to the blank by which the generating relationship is maintained during the feed, so that when the pitch circles of the cutter and gear being cut come into tangential contact the generation of the gear is completed, whereas by the method ordinarily employed the true generating action begins only after the cutter has been fed to a point where its pitch circle is tangent to the pitch circle of the gear being cut.

Having thus described my invention I claim:

1. A method of generating teeth in gear blanks by continuously rotating a gear shaped cutter on its axis and reciprocating the cutter across the face of a gear blank continuously rotating on its axis in intermeshing relation with said cutter, and simultaneously moving the cutter and blank closer together by relative movement along a line tangential to the pitch circle of the cutter and continuing this movement to move said cutter and blank apart.

2. A method of generating teeth in a gear blank by continuously rotating a gear shaped cutter on its axis and reciprocating the cutter across the face of a gear blank continuously rotating on its axis in intermeshing relation with the cutter, the axes of the cutter and gear blank being disposed angularly with respect to each other, and simultaneously moving the cutter and gear blank along a line tangential to the pitch circle of the cutter and continuing this movement to move said cutter and blank apart.

3. A method of generating teeth in a gear blank by rotating a gear shaped cutter continuously in the same direction on its axis and reciprocating the cutter across the face of a gear blank rotating on its axis in intermeshing relation with said cutter, one stroke of the reciprocating movement being a cutting stroke with the cutter in contact with the gear blank, the other stroke being a return non-cutting stroke with the cutter out of contact with the gear blank, simultaneously tangentially moving the cutter and blank closer together and continuing this movement to move said cutter and blank apart, and maintaining the rotation of the cutter and blank during the cutting strokes at speeds corresponding to the speeds at which they would be driven by their conjugate rack moving tangentially of the pitch circles of the cutter and blank.

4. A method of cutting helical gear teeth in a gear blank by rotating a gear shaped cutter in one direction and reciprocating said cutter across the face of the gear blank, one stroke of such reciprocating movement being a cutting stroke with the cutter in cutting contact with the gear blank while the other stroke is a non-cutting stroke to return the cutter to the original position and at the beginning of which stroke the cutter is preferably given an additional movement to withdraw it from contact with the gear blank to be again moved into position to effect contact during the cutting stroke; simultaneously tangentially moving the cutter or gear blank to bring the cutter and the gear blank closer together and continuing this movement in the same direction to move said cutter and blank apart; the gear blank meanwhile rotating on an axis disposed to the axis of the cutter corresponding to the helical angle of the teeth desired in the gear blank, the rotary motion of said cutter and said gear blank being of such velocity as would result if the teeth of said cutter and the resultant generated teeth of the gear blank were constantly in mesh with a continuously moving imaginary rack of infinite length.

5. The herein described method of generating teeth in gear blanks by continuously rotating a gear shaped cutter on its axis and reciprocating the cutter across the face of a gear blank continuously rotating on its axis in intermeshing relation with said cutter, gradually moving the axes of the cutter and blank closer together, and maintaining the rotation of the cutter and blank during such movement at speeds corresponding to the speeds at which the cutter and blank would be driven by their common intermeshing conjugate rack moving between them tangentially of the pitch circles of the cutter and blank.

6. The herein described method of generating teeth in a gear blank with a gear shaped cutter which comprises continuously rotating the cutter and gear blank at definite speeds in opposite directions with the peripheral speed of one slightly in excess of the peripheral speed of the other at the pitch circles of the cutter and gear to be generated, imparting a relative linear movement to said cutter and blank along a common tangent to said pitch circles at a rate corresponding to the relative movement which the cutter and gear to be generated would have if in mesh with an imaginary longitudinally moving rack common to the cutter and gear, and simultaneously reciprocating the cutter across the blank.

7. The herein described method of generating teeth in a gear blank with a gear shaped cutter which consists in moving the cutter and blank relatively to each other along a common tangent to the pitch circle of the cutter and the pitch circle of the gear to be generated, from a position in which the cutter is clear of the blank to a position in which said pitch circles are tangent, separating the cutter and blank by continuing said movement in the same direction, reciprocating the cutter across the blank during such movement and rotating the cutter and blank at relative speeds such that the relative linear movement corresponds to the relative movement which the cutter and gear would have if simultaneously meshing with the imaginary moving rack common to the gear and cutter.

8. The herein described method of generating helical teeth in a gear blank with a gear shaped cutter having longitudinally straight teeth which comprises positioning the cutter with its axis at an angle to the axis of the blank corresponding to the angle of the helix of the teeth to be cut, rotating the cutter and blank in intermeshing relation, reciprocating the cutter in the direction of its axis across the face of the blank, and imparting to the cutter and blank a relative linear movement transversely with respect to the cutter axis along the imaginary rack conjugate to the cutter and blank.

9. The herein described method of generating teeth in gear blanks by rotating a gear shaped cutter on its axis and reciprocating the cutter across the face of a gear blank rotating on its axis in intermeshing relation with said cutter, gradually moving the cutter and blank closer together, and maintaining the rotation of the cutter and blank during such movements at speeds corresponding to the speeds at which the cutter and blank would be driven by their common intermeshing conjugate rack moving between them tangentially of the pitch circles of the cutter and blank.

10. A method of generating teeth in a gear blank by rotating a gear shaped cutter on its axis and reciprocating the cutter across the face of a gear blank, one stroke of the reciprocating movement being a cutting stroke with the cutter in contact with the gear blank rotating on its axis in intermeshing relation with said cutter, the other stroke being a return non-cutting stroke with the cutter out of contact with the gear blank, simultaneously tangentially moving the cutter and blank closer together, and maintaining the rotation of the cutter and blank during the cutting strokes at speeds corresponding to the speeds at which they would be driven by their conjugate rack moving tangentially of the pitch circles of the cutter and blank.

11. A method of cutting helical teeth in a gear blank by rotating a gear shaped cutter in one direction and reciprocating said cutter across the face of a gear blank, one stroke of such reciprocating movement being a cutting stroke with the cutter in cutting contact with the gear blank while the other stroke of such movement is a return non-cutting stroke of the cutter to its original position, the cutter at the beginning of this last mentioned stroke preferably being given an additional movement to withdraw it from contact with the gear blank to be again moved into position to effect contact therewith during the cutting stroke, simultaneously tangentially moving the cutter or gear blank to bring the cutter and the gear blank closer together, the gear blank meanwhile rotating on an axis disposed to the axis of the cutter at an angle corresponding to the helical angle of the teeth desired in the gear blank, the rotary motions of said cutter and gear blank being of such velocity, as would result if the teeth of said cutter and the resultant generated teeth of the gear blank where constantly in mesh with a moving imaginary rack of infinite length.

12. A method of generating teeth in gear blanks by rotating a gear shaped cutter in intermeshing relation with a rotating gear blank, reciprocating the cutter across the face of the blank and moving the cutter and blank closer together by a relative movement along a line tangent to a pitch circle of the cutter and gear blank.

13. A method of generating teeth in gear blanks by rotating a gear shaped cutter in intermeshing relation, with a rotating gear blank, reciprocating the cutter across the face of the gear blank, and moving the cutter and gear blank closer together by relative movement along a line tangent to a pitch circle of the cutter and gear blank, the reciprocating movement of the cutter across the face of the gear blank being along a line angularly disposed with respect to the axis of the gear blank.

14. A method of generating teeth in a gear blank by rotating a gear shaped cutter on its axis and reciprocating the cutter across the face of a gear blank rotating on its axis in intermeshing relation with the cutter, the axes of the cutter and gear blank being disposed angularly with respect to each other, and simultaneously moving the cutter and gear blank closer together by relative movement along a line tangential to a pitch circle of the cutter.

15. A method of generating teeth in gear blanks comprising rotating a gear shaped cutter in intermeshing relation with a rotating gear blank, relatively reciprocating the cutter and blank transversely of their faces along a line angularly disposed with respect to the axis of the gear blank, and moving the cutter and gear blank closer together by relative movement along a line tangent to a pitch circle of the cutter and gear blank.

16. A method of generating helical teeth in gear blanks comprising rotating a gear shaped cutter in intermeshing relation with a rotating gear blank, relatively reciprocating the cutter and blank transversely of their faces along a line disposed at an angle to the axis of the blank corresponding to the angle of the helix of the teeth to be generated thereon, and moving the cutter and gear blank closer together by relative movement along a line tangent to a pitch circle of the cutter and gear blank.

17. A method of generating teeth in gear blanks comprising rotating a gear shaped cutter in intermeshing relation with a rotating gear blank, relatively reciprocating the cutter and blank transversely of their faces, and moving the cutter and gear blank closer together by relative movement along a line tangent to a pitch circle of the cutter and gear blank.

18. A method of generating teeth in gear blanks comprising rotating a gear shaped cutter in intermeshing relation with a rotating gear blank, relatively reciprocating the cutter and blank transversely of their faces and along the line of their axes, and simultaneously moving one of these members laterally along a path lying in a plane parallel to the plane of the axis of the other to bring the cutter and gear blank closer together.

19. The herein described method of generating teeth in gear blanks by rotating on its axis a gear shaped cutter having longitudinally straight teeth and reciprocating the cutter across the face of a gear blank rotating on its axis in intermeshing relation with said cutter, gradually moving the cutter and blank closer together, and maintaining the rotation of the cutter and blank during such movements at speeds corresponding to the speeds at which the cutter and blank would be driven by their common intermeshing conjugate rack moving between them tangentially of the pitch circles of the cutter and blank.

20. A method of generating teeth in gear blanks by rotating a gear shaped cutter having longitudinally straight teeth in intermeshing relation with a rotating gear blank, reciprocating the cutter across the face of the blank and moving the cutter and blank closer together by relative movement along a line tangent to the pitch circle of the cutter and gear blank.

21. A method of generating teeth in gear blanks comprising rotating the gear shaped cutter having longitudinally straight teeth in intermeshing relation with a rotating gear blank, relatively reciprocating the cutter and blank transversely of their faces along a line angularly disposed with respect to the axis of the gear blank and moving the cutter and gear blank closer together by relative movement along a line tangent to a pitch circle of the cutter and gear blank.

22. A method of generating teeth in gear blanks comprising rotating a gear shaped cutter having longitudinally straight teeth in intermeshing relation with a rotating gear blank, relatively reciprocating the cutter and blank transversely of their faces, and moving the cutter and gear blank closer together by relative movement along a line tangent to a pitch circle of the cutter and gear blank.

23. A method of generating teeth in gear blanks comprising rotating a gear shaped cutter having longitudinally straight teeth in intermeshing relation with a rotating gear blank, relatively reciprocating the cutter and blank transversely of their faces and along the line of their axes, and simultaneously moving the axes of the cutter and gear blank closer together by relative movement along a line tangent to a pitch circle of the cutter and gear blank.

24. A method of generating teeth in gear blanks comprising rotating a gear shaped cutter in intermeshing relation with a rotating gear blank, relatively reciprocating the cutter and blank transversely of their faces, and simultaneously moving one of these members laterally along a path lying in a plane parallel to the plane of the axis of the other to bring the cutter and gear blank closer together.

25. A method of generating teeth in gear blanks comprising rotating a gear shaped cutter in intermeshing relation with a rotating gear blank, the axes of the cutter and gear blank lying in parallel planes, relatively reciprocating the cutter and blank transversely of their faces, and simultaneously relatively moving said cutter and said gear blank laterally in paths that lie respectively in the planes of their axes to bring said cutter and gear blank closer together.

26. A method of generating teeth in gear blanks comprising rotating a gear shaped cutter in intermeshing relation with a rotating gear blank, the axes of said cutter and said gear blank being in parallel planes, relatively reciprocating the cutter and blank transversely of their faces, and simultaneously moving the cutter laterally along a path lying in the plane of its axis to bring the cutter and gear blank closer together.

27. The method of generating teeth in gear blanks comprising rotating a gear shaped cutter in intermeshing relation with a rotating gear blank, the axes of said cutter and said blank being in parallel planes, relatively reciprocating the cutter and blank transversely of their faces along a line angularly disposed with respect to the axis of the gear blank, and simultaneously relatively moving the cutter and gear blank laterally in paths lying respectively in the said planes of their axes to bring said cutter and blank closer together.

28. A method of generating teeth in gear blanks comprising rotating a gear shaped cutter in intermeshing relation with a rotating gear blank, the axes of said cutter and said blank being in parallel planes, relatively reciprocating the cutter and blank transversely of their faces and along the line of their axes and simultaneously relatively moving the cutter and blank laterally in paths lying respectively in said planes of their axes to bring said cutter and blank closer together.

OLIVER G. SIMMONS.